(12) United States Patent
Holtom

(10) Patent No.: US 8,130,800 B2
(45) Date of Patent: Mar. 6, 2012

(54) MODE-LOCKED SOLID STATE LASERS USING DIODE LASER EXCITATION

(75) Inventor: Gary R. Holtom, Boston, MA (US)

(73) Assignee: Battelle Memorial Institute, Richland, WA (US)

( * ) Notice: Subject to any disclaimer, the term of this patent is extended or adjusted under 35 U.S.C. 154(b) by 1392 days.

(21) Appl. No.: 11/724,625

(22) Filed: Mar. 14, 2007

(65) Prior Publication Data
US 2011/0170566 A1  Jul. 14, 2011

Related U.S. Application Data

(63) Continuation-in-part of application No. 11/436,731, filed on May 17, 2006, now Pat. No. 7,457,328.

(51) Int. Cl.
*H01S 3/113* (2006.01)

(52) U.S. Cl. ............. 372/11; 372/15; 372/18; 372/19; 372/99

(58) Field of Classification Search ............ 372/11, 372/15, 18–19
See application file for complete search history.

(56) References Cited

U.S. PATENT DOCUMENTS

| | | | |
|---|---|---|---|
| 5,652,756 A * | 7/1997 | Stultz et al. ............ | 372/10 |
| 6,229,645 B1 | 5/2001 | Hendrix | |
| 6,385,216 B1 | 5/2002 | Chang et al. | |
| 7,457,328 B2 | 11/2008 | Holtom | |
| 2002/0176471 A1 | 11/2002 | Peressini | |
| 2003/0008448 A1 | 1/2003 | Kafka et al. | |
| 2006/0092995 A1 * | 5/2006 | Frankel et al. ............ | 372/18 |

OTHER PUBLICATIONS

Boulon, "Yb$^{3}$+-doped oxide crystals for diodeo-pumped solid state lasers: crystal growth, optical spectroscopy, new criteria of evaluation and combinatorial approach," *Optical Materials*, vol. 22, pp. 85-87, 2003.

Brabec et al., "Mode locking in solitary lasers," *Optics Letters*, 16(24):1961-1963, Dec. 15, 1991.

Brunner et al., "Diode-pumped femtosecond Yb:KGd(WO$_4$)$_2$ laser with 1.1-W average power," *Optics Letters*, 25(15):1119-1121, Aug. 1, 2000.

Chen et al., "Optimization of fiber-coupled laser-diode end-pumped lasers: Influence of pump-beam quality," *IEEE J. Quantum Electron.*, 32(11):2010-2016, Nov. 1996.

Chenais et al., "Thermal lensing in diode-pumped ytterbium lasers—Part II: Evaluation of quantum efficiencies and thermo-optic coefficients," *IEEE J. Quantum Electron.*, 40(9):1235-1243, Sep. 2004.

German, "Polarization beam splitters for pumping of *F* II-center lasers," *Optics Letters*, 4(2):68-69, Feb. 1979.

Hauss et al., "Structures for additive pulse mode locking," J. Opt. Soc. Am. 8:2068-2076 (Oct. 1991).

(Continued)

*Primary Examiner* — Dung Nguyen
(74) *Attorney, Agent, or Firm* — Klarquist Sparkman, LLP

(57) ABSTRACT

A mode-locked laser employs a coupled-polarization scheme for efficient longitudinal pumping by reshaped laser diode bars. One or more dielectric polarizers are configured to reflect a pumping wavelength having a first polarization and to reflect a lasing wavelength having a second polarization. An asymmetric cavity provides relatively large beam spot sizes in gain medium to permit efficient coupling to a volume pumped by a laser diode bar. The cavity can include a collimation region with a controlled beam spot size for insertion of a saturable absorber and dispersion components. Beam spot size is selected to provide stable mode locking based on Kerr lensing. Pulse durations of less than 100 fs can be achieved in Yb:KGW.

25 Claims, 10 Drawing Sheets

OTHER PUBLICATIONS

Holtom, "Mode-locked Yb:KGW laser longitudinally pumped polarization-coupled diode bars," *Optic Letters* 31:2719-2721 (Sep. 2006).

Innerhofer et al., "60-W average power in 810-fs pulses from a thin-disk Yb:YAG laser," *Optics Letters*, 28(5):367-369, Mar. 1, 2003.

Lagatsky et al., "$Yb^{3+}$-doped $YVO_4$ crystal for efficient Kerr-lens mode locking in solid-state lasers," *Optics Letters*, 30(23):3234-3236, Dec. 1, 2005.

Liu et al., "Diode-pumped Kerr-lens mode-locked $Yb:KY(WO_4)_2$ laser," *Optics Letters*, 26(21):1723-1725, Nov. 1, 2001.

Magni, "Multielement stable resonators containing a variable lens," J. Opt. Soc. Am. 4:1962-1969 (Oct. 1987).

Röser et al., "131 W 220 fs fiber laser system," *Optics Letters*, 30(20):2754-2756, Oct. 15, 2005.

Encyclopedia of Laser Physics and Technology, http://www.rp-photonics.com/stability_zones.html (accessed Dec. 13, 2006).

Notice of Allowance dated Jul. 28, 2008, in U.S. Appl. No. 11/436,731, filed May 17, 2006, 4 pp.

Office Action dated Dec. 18, 2007, in U.S. Appl. No. 11/436,731, filed May 17, 2006, 10 pp.

* cited by examiner

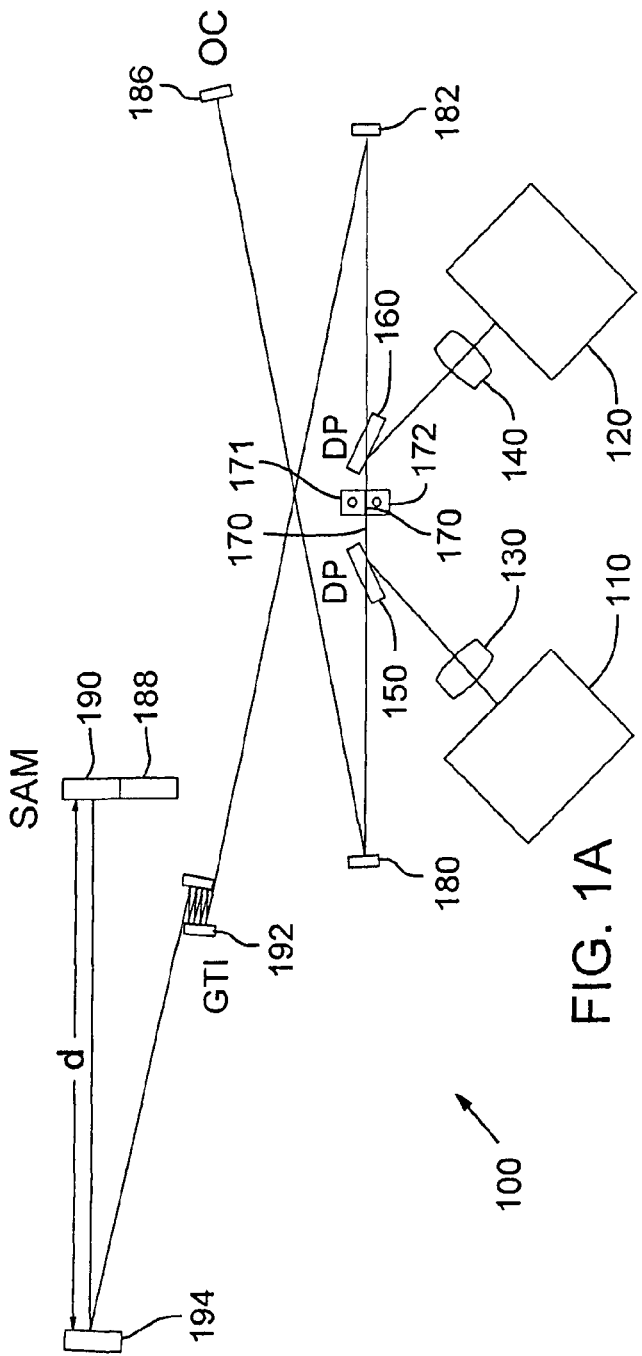
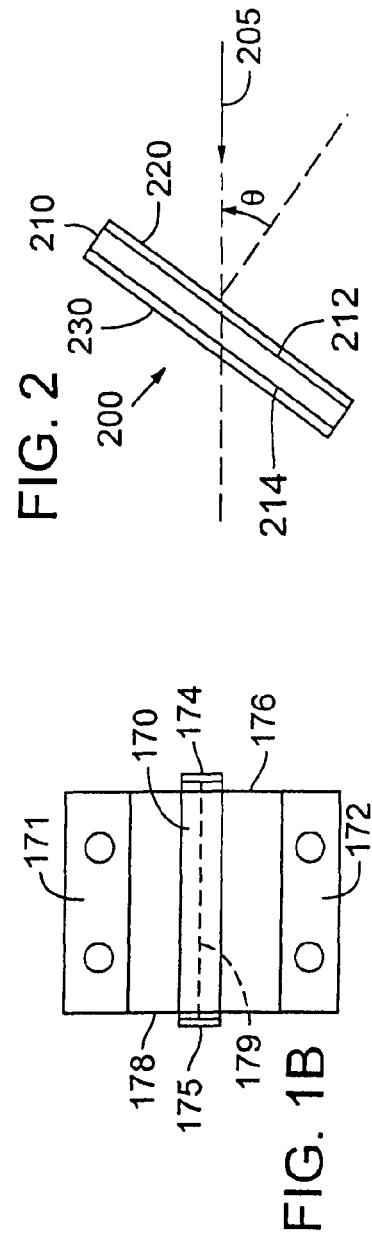

FIG. 8
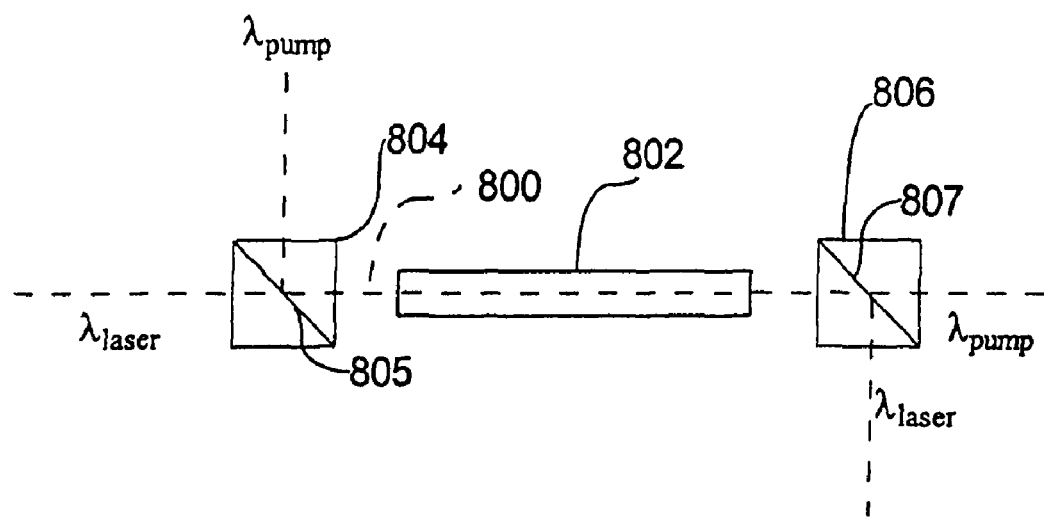
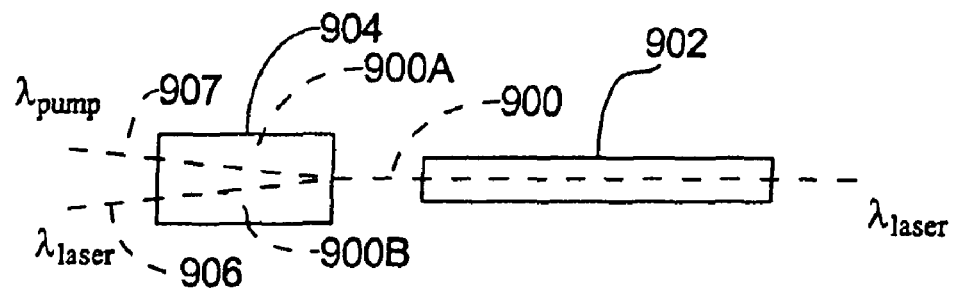
FIG. 9

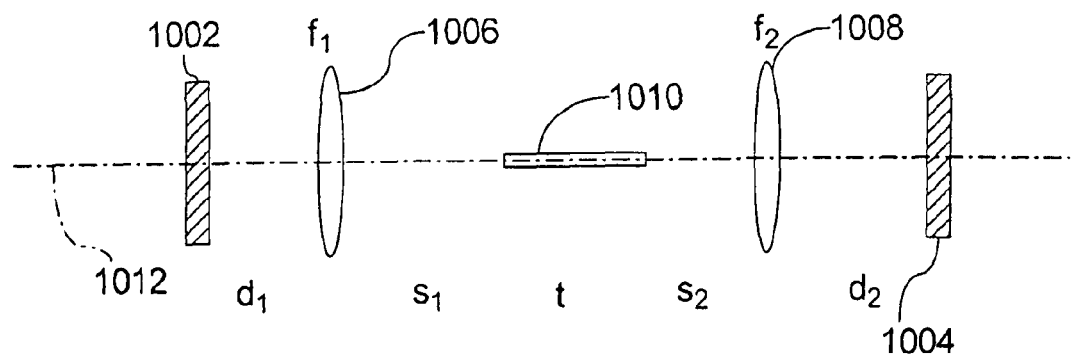
FIG. 10
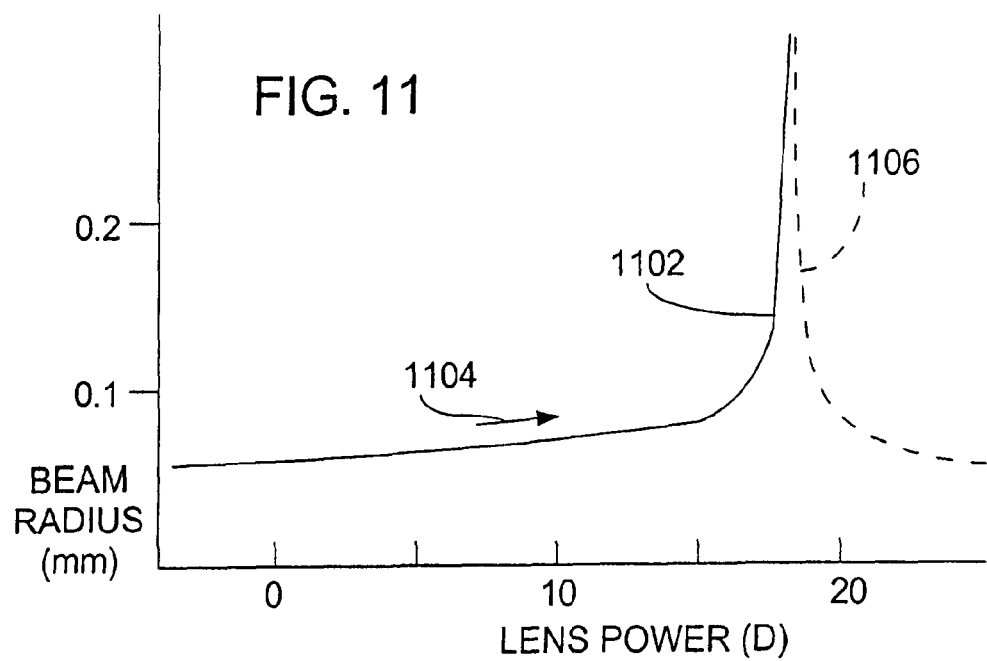

MODE-LOCKED SOLID STATE LASERS USING DIODE LASER EXCITATION

CROSS-REFERENCE TO RELATED APPLICATIONS

This application is a continuation-in-part of application Ser. No. 11/436,731, filed May 17, 2006 (now U.S. Pat. No. 7,457,328), entitled "Polarization Methods for Diode Laser Excitation of Solid State Lasers," that is incorporated herein by reference.

ACKNOWLEDGMENT OF GOVERNMENT SUPPORT

This invention was made with Government support under Contract DE-AC0576RLO1830 awarded by the U.S. Department of Energy. The Government has certain rights in the invention.

FIELD

The disclosure pertains to diode pumped mode-locked lasers.

BACKGROUND

Mode-locked (ML) lasers have a variety of industrial and scientific applications due to their extremely short pulse durations. For example, ML lasers can typically produce pulses with durations down to a few tens of femtoseconds. However, current laser systems that can provide these short pulse widths (e.g., ML Ti:Sapphire lasers) are frequently expensive, large, and can require special installations and delicate alignment procedures.

One approach to reducing the size and cost of ML lasers is to use diode laser pumping. Laser diodes are relatively inexpensive, and the required drive circuitry can be simple and compact. Unfortunately, the pump power available from a single laser diode is limited. Increased pump power can be provided with laser diode bars. Such laser diode bars typically include 10-50 laser diodes separated by about 100-200 μm. Unfortunately, laser diode bars emit from a large area due to the large diode separation, and efficient coupling of the laser diode emission into a laser host is difficult. In addition, some laser systems have pump and lasing wavelengths that differ by less than 100 nm. These laser systems can have high efficiency due to the small quantum defect, but it is difficult to design efficient optics to couple the pump laser into the gain medium when the pump and laser wavelengths are spectrally close.

Mode locked laser configurations also tend to take advantage of cavity designs associated with cavity stability limits. Typically such laser cavities are symmetric and include four mirrors, with the gain medium near the focal point of two folding mirrors, and the output coupler/high reflecting mirrors are flat. Such cavities are often associated with relatively small beam diameters in the laser gain medium, and can exhibit poor pump/laser beam overlap. Thus, overall efficiencies can be low so that the pulse energies tend to low, and beam quality can be unacceptable. In addition, a small lasing mode at any point in the cavity, particularly in the gain medium, can limit the maximum peak power of the laser due to nonlinear effects.

In view of the above, improved mode-locking methods and mode-locked lasers are needed.

SUMMARY

Lasers, including mode locked lasers, and pumping methods and apparatus are disclosed that provide efficient laser pumping and permit relatively large beam diameters in a gain medium. The disclosed methods and apparatus thus provide considerable flexibility in laser design.

Mode-locked operation of a Yb:KGW laser as described herein employs a coupled-polarization scheme for efficient longitudinal pumping by a pair of laser diode bars. The laser includes one or more dielectric polarizers configured to transmit a lasing wavelength with one polarization, and to reflect a pumping wavelength with a second polarization. The laser systems described herein have applications in multiphoton microscopy and spectrometry, and can also be used in amplifiers and optical parametric oscillators (OPO).

According to some examples, lasers comprise a gain medium situated on a laser axis and a laser cavity having a first cavity segment terminated by an output coupler and a second cavity segment terminated by a saturable absorber mirror (SAM). The first and second cavity segments are situated on the axis and on opposite sides of the gain medium and are optically asymmetric. The first cavity segment includes a collimation region and a dispersion device is situated in the collimation region. In some examples, the dispersion device is Gires-Tournois interferometer. In further examples, the first cavity segment includes a first fold reflector having a first optical power and the second cavity segment includes a second fold reflector having a second optical power, wherein the first fold reflector and the second fold reflector are situated to direct the laser beam into a pumped volume of the gain medium.

In additional examples, the laser further comprises a source of pump radiation that emits radiation substantially at a pump wavelength. A polarizer is configured to couple laser radiation at a laser wavelength and having a first state of polarization from the gain medium along the laser axis and the pump radiation from the source of pump radiation having a second state of polarization to the gain medium along a pump axis, wherein the laser axis and the pump axis are parallel and are substantially aligned in the gain medium. In a typical example, the source of pump radiation is an array of laser diodes. In some examples, the gain medium is situated to substantially absorb the pump radiation at the pump wavelength in the second state of polarization. In additional examples, the gain medium is situated to substantially absorb the pump radiation in substantially the second state of polarization and emit laser radiation in substantially the first state of polarization. In additional examples, the gain medium is Yb:KGW.

Lasers that produce mode locked pulses comprise an asymmetric cavity and a gain medium situated in the asymmetric cavity so that the mode locked pulses produce lensing in the gain medium so as to decrease a beam spot size in the gain medium. In some examples, a pump source is configured to establish a pump volume in the gain medium, wherein the pump source produces lensing in the gain medium that tends to decrease the beam spot size in the gain medium. In additional examples, a saturable absorber mirror terminates the asymmetric cavity. In further examples, the asymmetric cavity defines a collimation region, and the saturable absorber mirror is situated in the collimation region. In alternative examples, a mirror pair is configured to provide a selected negative dispersion, and the mirror pair situated in the collimation region. In some particular examples, the gain medium is Yb:KGW. In other examples, the gain medium is a slab of thickness t and the beam spot size in the gain medium is at least t/10. In further examples, the gain medium is a slab of length L and the beam spot size is at least L/100.

Mode locking methods comprise situating a gain medium in an asymmetric laser cavity. The gain medium is pumped so as to establish continuous wave laser output, and the laser cavity is terminated with a saturable absorber. A laser cavity dimension is then adjusted to establish substantially mode-locked operation. In some examples, the laser cavity dimension is a distance to the SAM along a laser axis, and the dimension adjustment is a decrease. In other examples, the laser beam is configured to be substantially collimated in a portion of the laser cavity, and a dispersion device such as a Gires-Tournois interferometer is situated in the collimated portion. In some examples, optical power is coupled out of the laser cavity with an output coupler having a reflectivity of less than about 85% and the gain medium is Yb:KGW. In further examples, the laser cavity is defined with an output coupler and a SAM that terminate the laser cavity and at least two fold mirrors having optical power, so that a substantially collimated region is situated between a fold mirror and the SAM.

In additional examples, the gain medium is pumped in a first polarization state and laser radiation is produced in a second polarization in response to the pump radiation. In some examples, the first polarization state and the second polarization state are substantially orthogonal. In other examples, a laser pulse duration is adjusted by selecting a negative dispersion magnitude.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The foregoing and other features and advantages of the disclosed technology will become more apparent from the following Detailed Description, which proceeds with reference to the accompanying drawings.

BRIEF DESCRIPTION OF THE DRAWINGS

FIG. 1A is a diagrammatic representation of one embodiment of a laser employing a coupled-polarization scheme.

FIG. 1B is a diagrammatic representation of one embodiment of a gain medium and surrounding elements.

FIG. 2 is a diagram of one embodiment of a dielectric polarizer.

FIGS. 8-9 are schematic diagrams illustrating polarization-based diode laser pumping of a laser gain medium.

FIG. 10 illustrates a cavity configuration for mode-locked or continuous wave laser operation.

FIG. 11 depicts laser beam radius as a function of cavity lensing in a symmetric cavity at two different two cavity lengths.

DETAILED DESCRIPTION

Figure 1C:
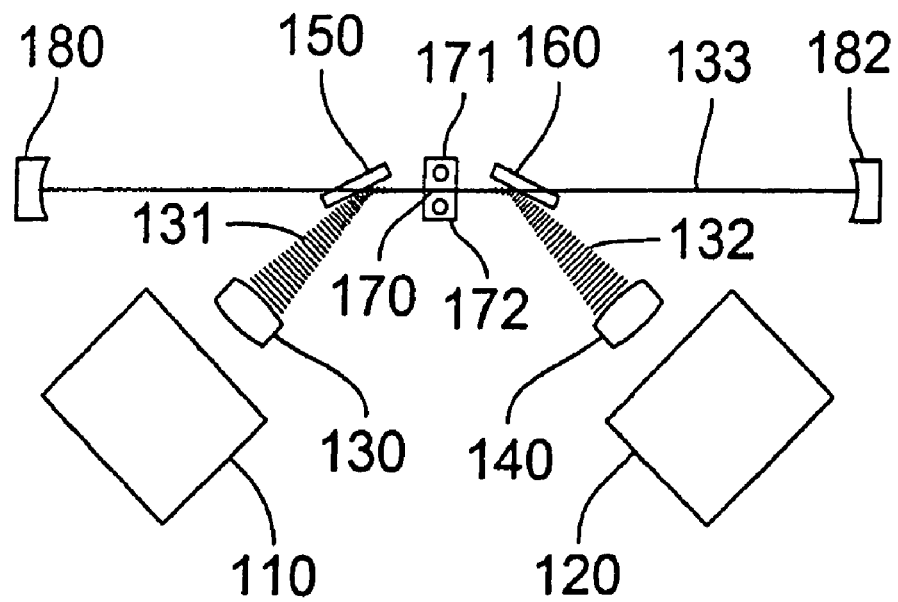
FIG. 1C is a diagrammatic representation of one embodiment of a laser cavity pumping scheme using the laser system shown in FIG. 1A.

As used in this application and in the claims, the singular forms "a," "an," and "the" include the plural forms unless the context clearly dictates otherwise. Additionally, the term "includes" means "comprises." Further, the term "coupled" means electrically, electromagnetically, or optically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience, representative examples are described with respect to a particular laser host, but different laser hosts can also be used without departing from the scope of the disclosure. In addition, some example laser systems are mode locked laser systems, but other examples include continuous wave (CW), Q-switched, cavity-dumped, or other laser configurations. For convenience, both pump and laser (or amplified) radiation are referred to as being at particular wavelengths, and a gain medium is referred to as having pump and gain wavelengths. Generally, these wavelengths are associated with a range of wavelengths in which pump radiation can be absorbed and in which laser radiation can be produced. As used herein, pump and laser wavelengths refer to such wavelength ranges as well as to particular selected wavelengths.

Laser cavities are described with respect to laser and/or pump axes. Typically, laser radiation or pump radiation exits or is delivered to a gain medium along such axes Pump and laser axes can be folded or deviated with lenses, mirrors, diffraction gratings, prisms, or other optical elements, and such axes do not necessarily extend only along a single straight line segment.

For convenience, laser beam cross-sectional dimensions are referred to as beam spot sizes or beam radii. In typical examples, these dimensions correspond to beam waists which represent a transverse dimension at which laser amplitude or intensity decreases to a predetermined fraction of an on-axis value, often based on an expected Gaussian beam profile. In the examples described herein, transverse beam profiles are substantially symmetric, but asymmetric modes can be used, and transverse modes can have minima or nulls. Beams can be referred to as collimated over distances that are not substantially greater than a so-called Rayleigh range that is proportional to a square of a beam waist divided by a beam wavelength.

In some examples, mode locked lasers are provided. As described herein, successful operation of a mode-locked laser to provide a stable train of pulses with uniform intensity and high powers can be associated with management of both geometric, intensity, and thermal effects. Geometric effects are typically associated with laser cavity geometry (cavity lengths, position and power or curvature of focusing elements such as lenses and mirrors). Stable mode-locking can depend on geometrical effects. For example, laser beam spot size in a laser cavity can be selected to produce, for example, a predetermined optical nonlinear effect. In some mode-locked lasers, nonlinear effects can cause changes in beam spot size and curvature related to stable-mode locking operation so that beam spot size is managed at one or more locations or regions in the laser cavity. Such non-linear effects include the optical Kerr effect, and mode-locking based on the optical Kerr effect is referred to herein as Kerr lens mode-locking (KLM). Because of these nonlinear effects, laser operation is dependent on peak and average powers and beam spot size. As disclosed herein, in some examples, lasers are configured to operate more or less stably in mode-locked operation or continuous (CW) operation based on selected geometric and power dependent considerations. Typically, lasers intended for mode-locked operation are configured so that mode-locked operation is more stable than CW operation. In addition, laser cavities can be provided with one or more optical elements that exhibit net negative optical dispersion so as to operate in a so-called "soliton mode" to produce soliton pulses.

Yb Lasers

Yb-doped gain media can be used in solid state laser systems producing short pulses. Such uses are possible, in part, due to the large spectral linewidth of Yb in crystalline hosts compared to other lasing species such as Nd. Since Yb is a quasi-three level system, higher intensity pumping can be required than for Nd lasers, but thermal effects in Yb lasers are reduced as a consequence of a smaller quantum defect. A number of crystalline hosts for Yb are known. Tungstate hosts have large optical cross-sections, which is a desirable property for efficient diode pumping. Output powers in mode locked operation using a single-element gain medium are typically no greater than about 1 W using a pair of single emission region laser diodes that each produce a few watts of pump light. Higher powers in both continuous and ML operation have been reported using thin-disk and fiber technologies, but these systems are generally more complex than low-power, directly pumped diode sources. The technology described below can produce lasers with powers comparable to or exceeding those of a ML Ti:Sapphire laser.

Relatively high pump powers are available from laser diode bars, and one challenge can be to effectively couple the emitters (e.g., 19 or more on a single 1 cm bar) into a single, focusable spot. With a substantially increased average power, thermal management can become important. This can be true even for the gain medium Yb:KGW, which has a high quantum yield for fluorescence and a low quantum defect of about 6% between the 981 nm pumping and 1040 nm lasing wavelengths. The optical anisotropy inherent in the low-symmetry monoclinic tungstate crystal can allow an efficient pump scheme using polarizers to couple the relatively divergent pumping light into a cavity, thereby providing a compact, inexpensive, and practical laser design.

KGW has a relatively large nonlinear refractive index. Because a laser cavity can be configured to provide a beam focus in the gain medium, the nonlinear refractive can be used for Kerr effect or "soft aperture" mode-locking.

One additional advantage of the Yb laser is that, since Yb operates at a relatively narrow frequency range, it is relatively easy to change the pulse width by changing the laser cavity dispersion. Optical elements for this purpose are less complex than required for broad-bandwidth gain materials such as Ti:Sapphire. Examples of this are described below in more detail.

Representative Yb Mode-Locked Laser Systems

FIG. 1A shows a diagrammatic representation (not necessarily to scale) of a cavity and a pump arrangement for a laser system 100. The system 100 comprises one or more pump sources, such as shaped diode bar assemblies 110, 120. Light from the assemblies 110, 120 (described below) can be focused into a single spot by lenses 130, 140, respectively, onto gain medium 170. Gain medium 170 is situated between dielectric polarizers (DPs) 150, 160, and can be selected for its polarizing properties. Efficient polarizing optics that have a high transmission in one polarization state and a high reflection in another polarization state are available, and the small difference in pump and laser wavelength is not a difficult design limitation. For example, the gain medium 170 can be selected such that pump light is absorbed by the gain medium 170 in a first polarization state and laser light is emitted in a second polarization state. Absorption cross sections can be functions of a state of polarization such as linear, elliptical, or circular polarizations. In some laser hosts, pump light and laser emission can be arranged to be in substantially orthogonal linear polarizations. In other examples, non-polarizing gain media may also be used in which absorption and emission states of polarization are generally not functions of the gain media but of the optical system used to define a resonant cavity. The state of polarization for laser radiation in isotropic and anisotropic gain media can be selected based on differences in cavity losses for different polarization states. The gain medium 170 can be adjacent to a cooling system such as cooling plates 171, 172 to control gain medium temperature, thermal focusing, and temperature (or stress) induced birefringence.

In some embodiments, the collimating optics can be integrated with diode bar assemblies 110, 120, or they can be provided in separate packages. The collimating optics reshape the pump beams from the laser diodes for delivery to the gain medium. Typically, the diode laser pump beams are combined and configured to overlap a selected laser emission spatial mode. Single diodes can be used in place of diode bar assemblies 110, 120, but such single emitters generally cannot provide as much power as laser diode bar assemblies. For example, a single-emitter diode may generate about 6 W of pump power, while a bar assembly can generate powers of 20-30 W or more. In a typical example, the output beam from the diode assemblies 110, 120 is vertically polarized, and the diode assemblies 110, 120 are water-cooled. Preferably, the diode assemblies 110, 120 are small enough to couple directly or almost directly to the gain medium 170 and additional relay optics are unnecessary.

The laser system 100 further comprises reflectors 180, 182 (also known as "fold mirrors") and an output coupler (OC) 186. Reflectors 180, 182 have radii of curvature of about 500 mm and have negative dispersion coatings. To control negative dispersion, the laser system 100 can also comprise a saturable absorber mirror (SAM) 190 configured to receive light that has passed through a multiple-bounce Gires Tournois Interferometer (GTI) 192. In an example, each GTI reflection provides about $-1300$ fs$^2$ and more than eight reflections can be provided. Negative dispersion can also be controlled by the reflectors 180, 182. Light can be directed from the GTI 192 to the SAM 190 by a fold mirror 194. In one example, the fold mirror 194 has a radius of curvature of about 800 mm. The SAM 190 and the fold mirror 194 are separated by a distance d, which can be adjusted to improve laser power and stability using a translation stage 188. Selection of particular combinations of the OC 186 and the SAM 190 can allow for soliton mode locking but similar pulse outputs can be obtained with SAMs having saturable absorbances of 0.7%, 1.0%, and 1.5%, indicating that soliton effects tend to control pulse output. The cavity of FIG. 1A can provide independent control of laser beam spot sizes in the gain medium 170 and in the SAM 190 for stable ML operation. Preferably, the fold angles in the cavity are small (e.g., less than about 3 degrees) so that cavity astigmatism is small. Lasing wavelength can be tuned by changing cavity dispersion.

Dielectric Polarizers

Some Yb:KGW and Yb:KYW laser media exhibit large optical absorption and emission cross-sections for radiation that is polarized parallel to a crystal a-axis. A crystal b-axis has a smaller absorption cross-section than the a-axis, but the emission cross section of the b-axis is nearly as large as the a-axis maximum. Transmission losses for laser radiation polarized along the b-axis are also generally smaller than those polarized along the a-axis. These properties can be used in selection and arrangement of a dielectric polarizers (such as dielectric polarizers 150, 160), as shown in more detail in FIG. 2.

As seen in FIG. 2 (which is not necessarily to scale), dielectric polarizer 200 comprises a substrate 210. The polarizer 200 is configured to be tilted at an angle of incidence θ with respect to a lasing beam 205 emitted from the gain medium 170 (not shown in FIG. 2). A coating 220 is applied to a first surface 212 of substrate 210 that receives the laser beam (and is situated so as to face a gain medium such as the gain medium 170 of FIG. 1A). The coating 220 is configured have a reflectance and transmittance that are functions of state of polarization so that dielectric polarizer 220 is a polarization-sensitive dichroic mirror.

The coating 220 is typically selected to provide a high reflectivity for S-polarized radiation incident at the angle θ, and it is generally configured based on the angle of incidence θ and a refractive index of the substrate 210. The coating 220 typically includes a plurality of dielectric layers, wherein the dielectric layers have refractive indices of between about 1.40 and 2.30. The substrate 210 can be made of, for example, optical glasses such as BK-7 or other glasses, fused silica, or other optical materials that are substantially transparent to radiation at either the pump wavelength or the laser wavelength (or both). Composition (i.e., number, thickness, and refractive index) of the layers of the coating 220 can be adjusted based on the refractive index of the substrate 210.

An additional coating 230 can be applied to substrate 210 on a second surface 214 that is typically situated so as to face away from gain medium 170. The coating 230 is generally configured as an antireflection coating for the laser radiation. In some examples, the dielectric polarizer 200 is situated so that the laser beam is incident at an angle θ that corresponds to a Brewster angle so that a P-polarized laser beam is transmitted by the dielectric polarizer 200 without substantial reflection. In either case, the polarizer 200 generally reflects light of a first polarization and wavelength while generally transmitting light of a second polarization and wavelength. For example, in one embodiment, the polarizer 200 reflects S-polarized radiation (typically, pump radiation) with a wavelength of about 981 nm and transmits P-polarized laser radiation (typically, laser radiation) with a wavelength of about 1040 nm. Alternatively, the dielectric coating 220 can be configured to substantially transmit pump radiation, and to substantially reflect laser radiation. In this embodiment, the polarizations of the pump and laser radiation are still substantially perpendicular to each other.

Example Implementation

In one implementation of laser system 100, the diode bar assemblies 110, 120 are not identical, but provide 15 W and 20 W, respectively, in a far-field single spot at a drive current of 35 A. One such diode assembly is a Model S14-981-1 diode assembly, available from Apollo Instruments, Inc., Irvine, Calif. In this particular diode assembly, 19 laser diodes are placed horizontally, end-to-end, but an assembly with vertically stacked diodes can also be used. Collimating optics can focus magnified images of individual emitters (the magnified images can be, for example, about 0.5 by 10 mm) into an output beam of about 10 mm by 10 mm, with a nominal beam divergence of 3 mrad in each direction. The lenses 130, 140 are achromatic and have a focal length of 75 mm.

FIG. 1B shows the gain medium 170 and some possible surrounding features in more detail. The gain medium 170 is an Yb:KGW crystal that can be, for example, a 10 mm square slab situated for near-normal-incidence longitudinal pumping. Anti-reflection coatings 174, 175 can be provided. The crystal is approximately 1.4 mm thick and has an Yb doping of 1.5%. The geometry of the laser crystal, a thin slab cooled on two long sides, permits efficient heat removal. Such a crystal can be obtained from NovaPhase, Inc., Newton, N.J. Other crystals can be used. The 10 mm square faces of the gain medium 170 are adjacent to water-cooled plates 171, 172 that are thermally coupled to the gain medium 170 with indium foil layers 176, 178. Light entering the gain medium 170 therefore propagates along an axis 179 through the crystal. As shown in the example of FIG. 1A, the Yb:KGW crystal is situated so that a crystal a-axis is vertical, and a crystal b-axis is horizontal.

Referring further to FIGS. 1A-1B, both the pump and laser beams propagate along the axis 178, thus providing a relatively long absorption/gain path in the gain medium 170. This long path and the relatively low Yb doping can reduce temperature rises at edges of the Yb:KGW crystal, but such a long path is typically associated with matching a divergence of the diode pump beam over the long laser/pump beam overlap region. For this particular Yb:KGW crystal, measured average pump beam absorption is about 93% (more than 98% at the absorption center wavelength).

Figure 1D:
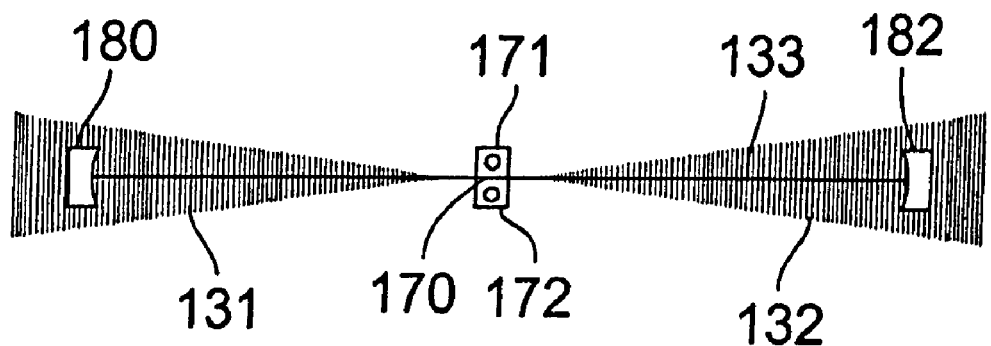
FIG. 1D is a diagrammatic representation of a prior art laser cavity pumping scheme.

FIGS. 1C-1D compare some possible configurations for laser cavities pumped with convergent diode beams. Gray areas in these figures represent paths of diode pump beams. FIG. 1C depicts a laser cavity similar to that of laser system 100 of FIG. 1A, where pumping beams 131, 132 enter the cavity at an angle relative to lasing beam 133. FIG. 1D shows a more traditional laser cavity configuration where pump beams 131, 132 enter the cavity approximately parallel to lasing beam 133, perhaps through mirrors 180, 182.

Returning to FIG. 1A, the laser system 100 can be configured to couple a pumping beam with a large numerical aperture into the gain medium 170. In one embodiment, the laser beam has a diameter of about 6-8 cm at reflectors 180, 182. As mentioned above, in other examples the diode bar assemblies 110, 120 can be situated so as to direct pump radiation through the reflectors 180, 182 to the gain medium 170. System 100 can be configured to be relatively compact due at least in part to polarizers 150, 160. These polarizers preferably have little effect on the properties of the laser cavity as a whole.

In a particular example, a first set of dielectric polarizers 150, 160, comprising a first type of coating, has greater than 98% reflectivity for P-polarized radiation at the pump wavelength and 99.8% transmission for S-polarized radiation at the laser wavelength when situated at about a Brewster angle. To avoid optical damage, the dielectric polarizers 150, 160 can be situated several centimeters from the gain medium 170, or otherwise displaced from the gain medium 170. Also, the output coupler 186 can be changed to have a lower or higher reflectivity. In another example, a second set of dielectric polarizers, comprising a second type of coating, had 89% reflectivity and 99.3% transmission at pump and laser wavelengths, respectively. However, this second coating was more resistant to optical damage, and was capable of operating for hundreds of hours without any additional displacements from the gain medium 170.

Some cavity distances for this particular embodiment are shown in Table 1. Those of skill in the art will recognize that other distances can be used, and other cavity configurations are possible. The dielectric polarizers 150, 160 are placed close enough to the gain medium 170 to allow a focal spot that is of sufficient size for effective pumping of the quasi-three-level Yb:KGW laser.

TABLE 1

Representative Laser Cavity Dimensions

| Cavity Distance | Length (mm) |
| --- | --- |
| d | 577 |
| Long arm (reflector 182 to fold mirror 194, including mirror bounces in GTI 192) | 1870 |
| Reflector 180 to OC 186 | 750 |
| Reflector 180 to gain medium 170 | 355 |
| Reflector 182 to gain medium 170 | 370 |

Obtaining a high quality, diffraction-limited laser beam can require careful alignment of the pump laser diodes, and is achievable with a lasing radius between 100 and 180 μm at the gain medium 170. Radiation in the long arm in this embodiment is well collimated, and is suitable for insertion of a GTI mirror pair. The OC 186 has 85% reflectivity. Continuous wave (CW) output power (measured with a high reflectivity mirror in place of the SAM) is 7.6 W, and depends on the distance from the fold mirror 194. The round-trip cavity loss from the dielectric polarizers 150, 160 is about 2.8%, with about 1% additional loss from the antireflection coatings on the gain medium 170 and from mirror losses. While this cavity has greater losses than some other Yb diode-pumped laser configurations, the gain and output power levels are also greater. Operation with a high-transmission output coupler has the advantage that a SAM with substantial loss can be used effectively to enforce stable single-pulse mode-locked operation while minimizing heating in the SAM.

Figure 3:
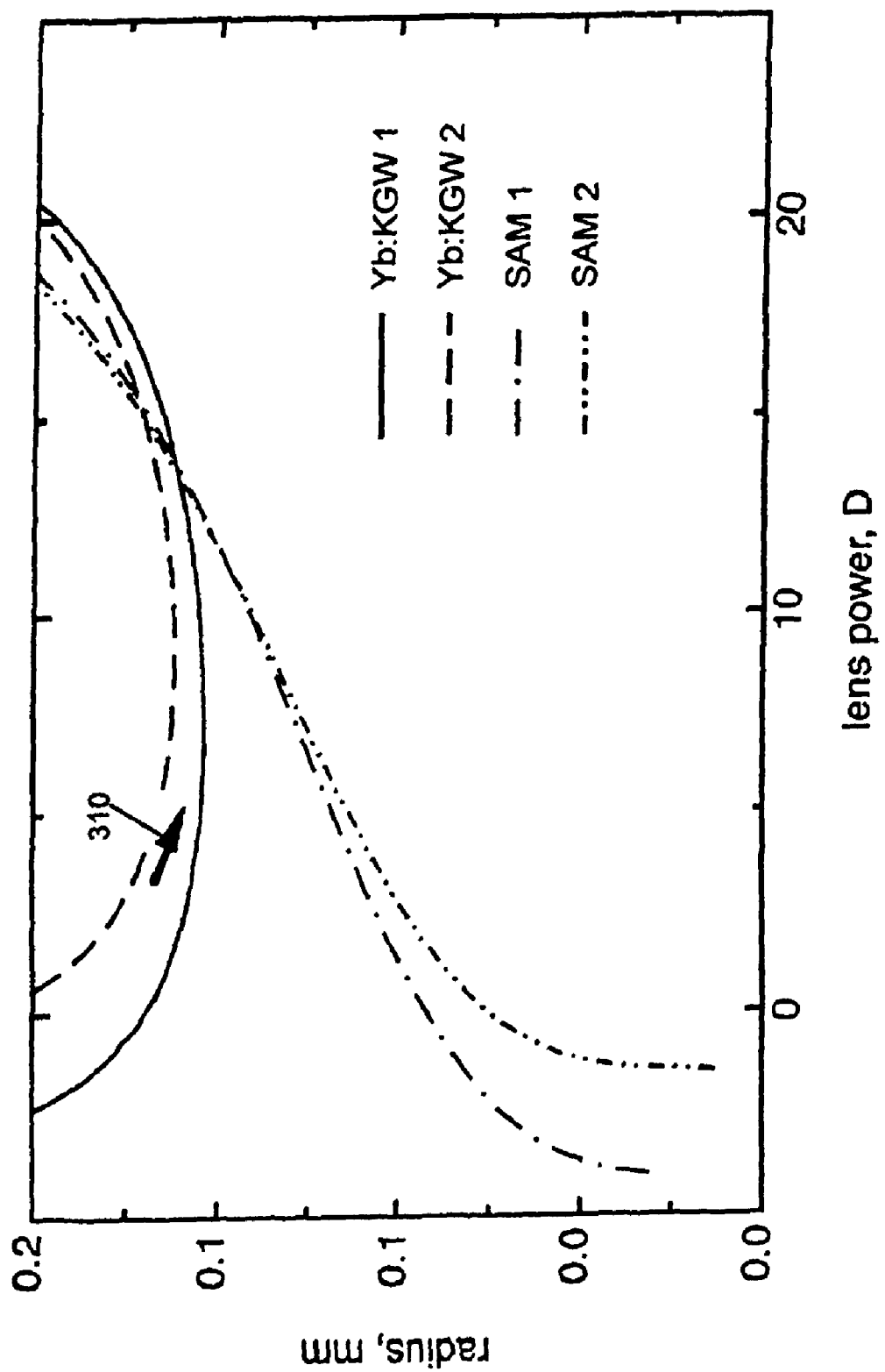
FIG. 3 is a representative plot of spot sizes, as a function of lensing, in a Yb:KGW crystal and in a saturable absorber mirror (SAM).

With diode-pumped solid state lasers, cavity alignment and stability can depend on thermal lensing. Thermal lens effects in a strongly pumped Yb:KGW crystal can be as large as 10 diopters ("diopters" or $m^{-1}$, abbreviated "D") with 7 W of absorbed pump light. FIG. 3 shows plots of one set of measurements for laser beam spot radii in a Yb:KGW crystal gain medium and a SAM as a function of thermal lensing in Diopters. Continuous wave (CW) lasing occurs at a thermal lensing of 3 D, and ML operation occurs with larger thermal lensing. All spot sizes are calculated using the inferred 3 D lens. The thermal lensing under lasing conditions was determined by systematically exploring the stability limits of a symmetric 4-mirror cavity.

The plots of FIG. 3 were obtained using two different values for d. Measurements represented by Yb:KGW 1 and SAM 1 were obtained with d=577 mm, a distance selected to provide long pulses. Measurements represented by Yb:KGW 2 and SAM 2 were obtained with d=572 mm, a distance selected to provide stable, short pulses. As the system 100 transitions from continuous to ML operation, the operating point of the system 100 moves in the direction of arrow 310 (i.e., the laser is forced to operate with additional lens power provided by the combination of nonlinear effects in the gain medium and the thermal lensing due to the diode pump light).

Stable ML operation can be produced in the example implementation as follows. The diode focus and overlap is optimized with CW lasing using a beam radius in the gain medium 170 of about 100 μm, and an 85% reflectivity OC 186. CW power is about 9 W and is nearly constant for spot sizes from less than about 100 μm radius to about 125 μm radius. The mirror cavity is adjusted to produce a spot size of 156 μm, with a decrease in spot size due to the additional lensing induced by nonlinear effects (indicated by arrow 310 in FIG. 3). The SAM 190 (available from BATOP Optoelectronics GmbH) has a reflectivity of 0.7-1.7% at low intensities. A SAM with higher absorbance can allow for self-starting mode locking over a wider range of cavity configurations than a SAM with a lower absorbance. For a SAM with a lower absorbance, a light tap can be required to initiate mode locking. In practice, it is convenient to place the SAM 190 on the translation stage 188 to easily adjust d and to locate a stable operating point. Operation with shorter pulses requires decreasing the distance d, resulting in the second operating point indicated in FIG. 3 (represented by the curves labeled Yb:KGW 2 and SAM 2). Under ideal conditions, lens powers higher than those shown in FIG. 3 can result.

In this particular embodiment, the reflectors 180, 182 have a combined dispersion of $-1300\ fs^2$, enough to offset the positive material dispersion of the gain medium 170. Additional dispersion is provided by a flat mirror pair in GTI 192, with each reflection providing about $-1000\ fs^2$. Mirrors of 12.7 mm diameter can accommodate between 1 and 4 spots per mirror.

Figure 4A:
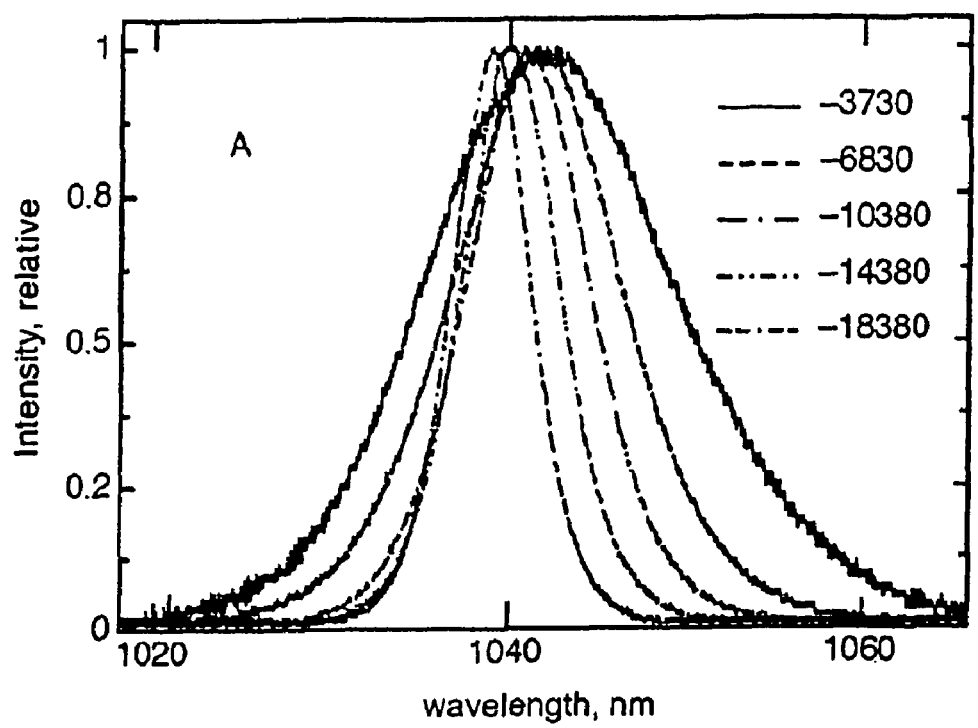
FIGS. 4A and 4B are spectra and autocorrelation traces, respectively, for pulse obtained with cavity dispersions listed in Table 1.
Figure 4B:
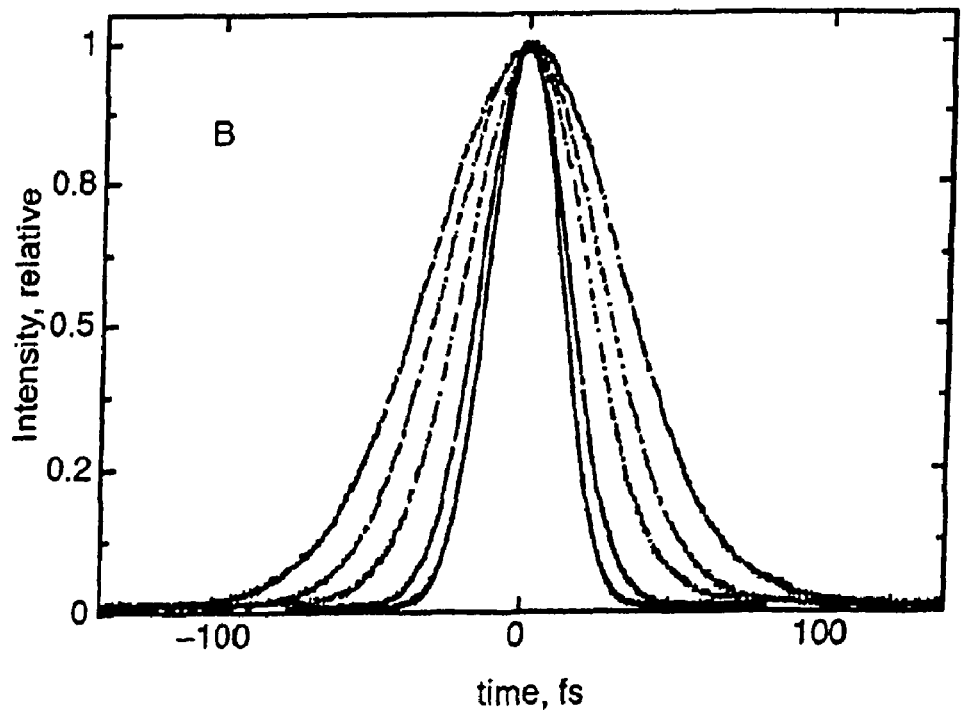

Table 2 shows sets of measurements taken from the example implementation of system 100 described above. In this table, D is the estimated net round-trip cavity dispersion, SW is the spectral half-width, T is the measured pulse width (assuming a $sech^2$ deconvolution factor), and P is the output power. As seen in Table 2, the spectral pulse width and measured pulse width vary linearly with total negative dispersion, as expected from soliton-mode theory. The spectra and autocorrelation shapes are plotted in FIGS. 4A and 4B, respectively, for each set of measurements in Table 2. The plots are relatively smooth, and the pulses have a stable amplitude as observed with a fast diode and oscilloscope. The shortest pulses are about 1.4 times the transform-limited width, assuming a hyperbolic-secant pulse shape, but the longer pulses are transform limited to within the measurement accuracy. A 1.5% absorbance SAM was used for the results presented in FIGS. 4A and 4B, and in Table 2.

TABLE 2

Example Laser Characteristics

| D (fs$^2$) | SW (nm) | T (fs) | P (W) |
|---|---|---|---|
| −3730 | 16.4 | 90 | 3.7 |
| −6380 | 11.2 | 108 | 4.3 |
| −10380 | 8.3 | 150 | 5.1 |
| −14380 | 6.5 | 193 | 5.5 |
| −18380 | 5.2 | 236 | 5.9 |

As seen from the results in Table 2, laser system 100 can provide approximately 6 W at 1040 nm with 236 fs pulse width. With changes in cavity dispersion, the pulse width can be adjusted to less than 100 fs.

In another example, a net group delay dispersion of about −18,200 fs$^2$ produced a measured pulse width of about 350 fs FWHM, or a width of 225 fs assuming a hyperbolic-secant pulse shape. The output power was about 6.3 W. Other example pulse widths and output powers as a function of numbers of reflections in a GTI are listed in Table 3. In Table 3, GVD is group velocity dispersion, and pulse width is obtained from measured values and sech$^2$ deconvolution.

TABLE 3

Pulse widths and output powers for 1, 2, 4, and 8 GTI reflections.

| GTI Reflections | GVD (fs$^2$) | Spectral Width (nm) | Pulse Width (fs) | Output Power (W) |
|---|---|---|---|---|
| 1 | −6,200 | 11.3 | 134 | 5.3 |
| 2 | −14,600 | 6.0 | 228 | 8.6 |
| 4 | −25,000 | 5.0 | 292 | 9.9 |
| 8 | −45,800 | 3.1 | 433 | 10.0 |

The role of nonlinear refractive index (Kerr lens mode locking, or KLM) in the stabilization of ML pulse formation is well known. The role of the SAM 190 in this laser can be in initiating a high-power pulse. When the SAM 190 is replaced by a high reflectivity mirror, intense modulation is seen during mirror translation or tapping a mirror, and in some cases, bursts of ML pulses are observed. The spectral and autocorrelation profiles of this laser, at the pulse widths shown in Table 2, are similar to those of reported "pure" KLM lasers. KGW crystals in general have a high refractive index (about 2.0 for radiation polarized parallel to the b-axis), and a large nonlinear refractive index n$_2$ has been recently reported.

In the example implementation, no damage of the SAM 190 is seen as long as the laser spot size is larger than about 100 μm with the 85% reflectivity OC 186. Higher reflectivity output couplers and larger mode diameters in the Yb:KGW crystal generally result in optical damage to the SAM unless the laser spot size at the SAM 190 is increased. In one case, at a repetition rate of 36 MHz and a power of 5.9 W, pulse energy was 164 nJ with a pulse width of 236 fs. With higher-power diode collimation packages and improved polarizers, laser efficiency and output power can be increased.

Example Applications

The output of laser system 100 can be suitable for pumping a number of optical systems. Demonstrated laser powers for the laser system 100 are competitive with conventional Ti:Sapphire ultrafast lasers. In addition, the Yb:KGW lasers described herein are relatively simple and inexpensive since a high-quality, visible pump laser is not required. By scaling laser spot sizes, inexpensive, single-emitter diode pump lasers can provide output powers of several watts, so that such Yb:KGW lasers are well suited for optical systems for multiphoton microscopy and nonlinear spectroscopy.

Figure 5:
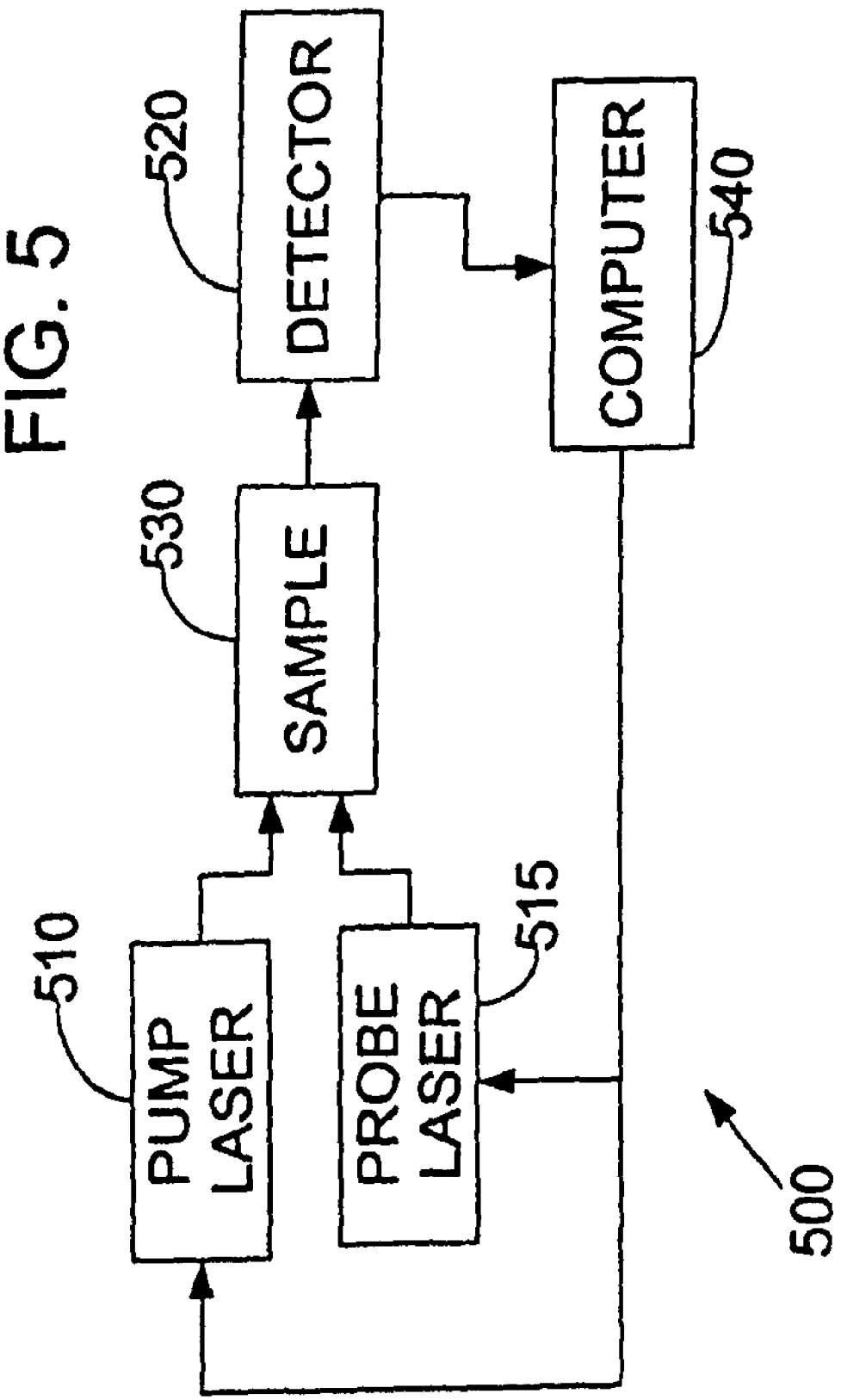
FIG. 5 is a block diagram of one example of a detection system.

FIG. 5 is a block diagram of an nonlinear spectroscopy system 500. The system 500 comprises a pump laser 510 and a probe laser 515 that can be similar to the laser system 100 of FIG. 1A. The pump laser 510 and the probe laser 515 are configured to direct respective beams to a sample 530. The detector 520 can be configured to communicate results or to receive configuration data from a computer 540 that can be configured to process measurements and control the pump laser 510 and the probe laser 515.

Figure 6:
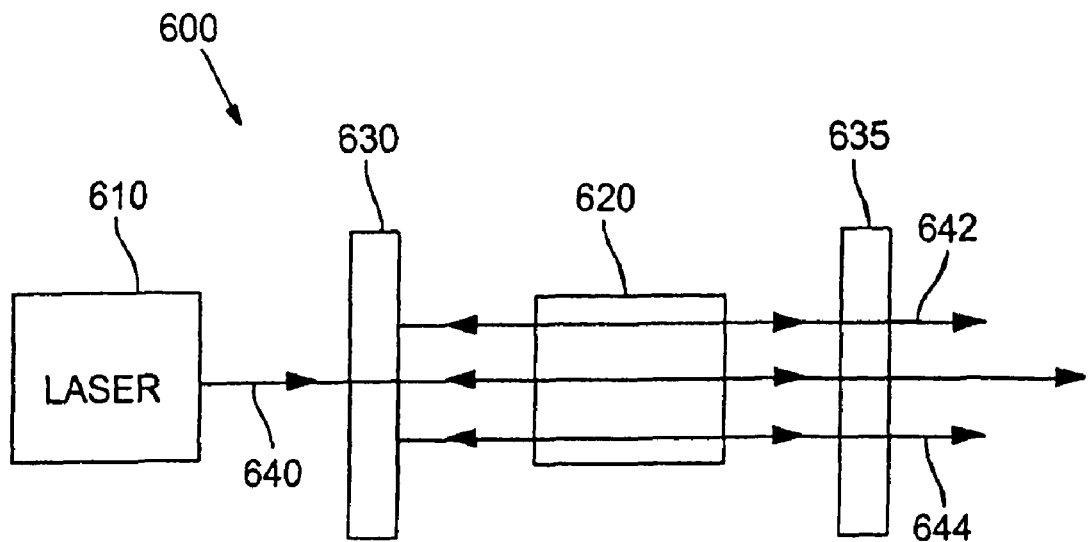
FIG. 6 is a block diagram of an example optical parametric oscillator (OPO) system.

The laser of system 100 can also be used in conjunction with other elements to modify an emitted laser beam for various applications. For example, FIG. 6 is a block diagram of an example optical parametric oscillator (OPO) system 600. The system comprises a laser 610, similar to the laser system 100 of FIG. 1A, a non-linear optical medium 620, and dielectric mirrors 630, 635. Laser 610 generates a pump beam 640 which enters the optical cavity formed by the optical medium 620 and the mirrors 630, 635. Optical medium 620 can be selected from the many media known in the art, and typically is a crystalline non-linear material. The pump beam 640 interacts with the optical medium 620 so as to produce a nonlinear polarization that can radiate to produce additional beams 642, 644 that are emitted from the mirror 635. The wavelengths of the beams 642, 644 can be selected using techniques such as, for example, selection of suitable phase matching conditions in the non-linear optical medium 620. Phase matching can be provided based on an orientation or temperature of the medium 620.

The example laser system 100 of FIG. 1A can also be used to pump other types of OPO systems as are known in the art. Coherent beams 642, 644 may be used in multiphoton microscopy or spectroscopy systems, or in other appropriate applications. One laser 610 may be used to pump multiple OPO systems, and the systems can produce beams with different wavelengths.

Figure 7:
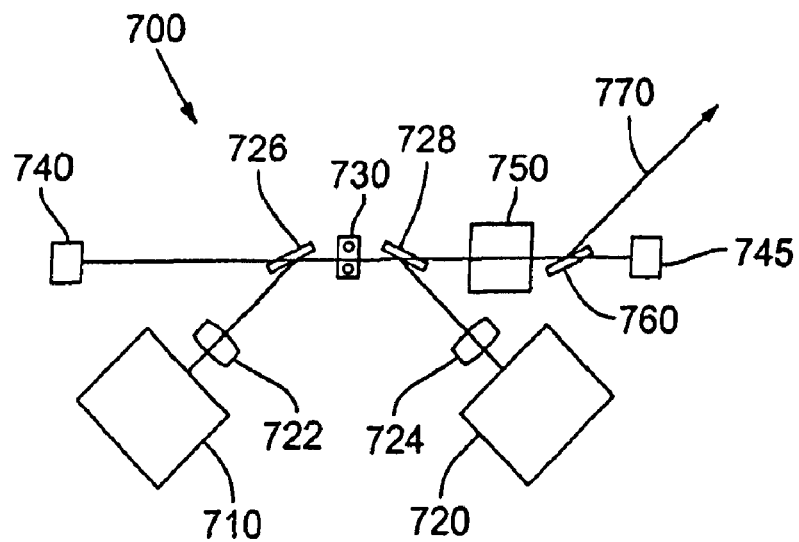
FIG. 7 is a block diagram of an example regenerative amplifier system.

Laser system 100 can also be used in an oscillator or amplifier. FIG. 7 shows a block diagram of an example regenerative amplifier system 700. The system 700 comprises diode bar assemblies 710, 720, lenses 722, 724, dielectric polarizers 726, 728, and mirrors 740, 745. Some or all of these elements can be similar to those described above with respect to system 100 of FIG. 1A. System 700 further comprises a gain medium 730 with surrounding elements. This can be a longitudinally pumped Yb:KGW crystal, similar to the medium described above with respect to FIGS. 1A and 1B. Other gain media known in the art can also be used. System 700 further comprises a Pockels cell or other modulator 750. An additional mirror 760 transmits an amplified beam 770, possibly to additional components (not shown) as are known in the art, such as a pulse stretcher or pulse compressor, for example. In an additional application, laser system 100 can be used for pumping other amplifiers such as a fiber amplifier that includes an Yb-doped fiber. In other applications, laser system 100 can be used for materials processing with focused beams.

In the examples above, pump radiation is supplied to a gain media using a dielectric polarizer configured for placement at or near the Brewster angle for the laser beam. In other examples, polarizing beam splitters that include a dielectric coating can be used, or crystalline polarizers such Wollaston polarizers, beam splitting Glan-Thompson prisms, or other prism or beam splitter configurations can be used. Such crystalline polarizers are typically made of crystal quartz, calcite, or other birefringent materials. These crystalline materials can be uniaxial or biaxial, and orthogonal states of polarization can be combined or separated as needed for diode pumping based on differences in a critical angle or angles of refraction due to the different refractive indices for pump and laser wavelengths. Some examples are illustrated in FIGS. 8-9.

Referring to FIG. 8, a gain medium 802 is situated so as to define an axis 800. Pump radiation at a pump wavelength $\lambda_{pump}$ is coupled from pump sources (not shown) to the gain medium 802 by reflection from a dielectric layer 805 of a first polarizing beam splitter 804 and transmission through a dielectric layer 807 of a second polarizing beam splitter 806. In the configuration of FIG. 8, laser radiation is polarized so as to be substantially transmitted by the polarizing beam splitter 804 and substantially reflected by the polarizing beam splitter 806. The axis 800 is extended in FIG. 8 to include axis portions defined by reflections by the beam splitters. The gain medium 802 can be optically anisotropic and can be situated so that pump and laser radiation polarization states are associated with different preferred emission/absorption cross sections of the gain medium 802. The polarizing beam splitters 804, 806 can be dielectric polarizing beam splitter cubes, or can be based on crystalline materials.

FIG. 9 is a schematic diagram illustrating pumping of a gain medium 902. Pump and laser radiation (or amplified radiation) are coupled to or from the gain medium 902 along respective axes 900A, 900B and propagate along an axis 900 in the gain medium 902. The axes 900A, 900B are defined by a crystalline beam combiner 904 that is based on differences in refractive index for different states of polarization.

Mode Locking

According to representative examples, an asymmetric cavity can be provided for use in producing soft-aperture KLM without operation at or near a stability limit. As shown in FIG. 10, a four mirror cavity includes end mirrors 1002, 1004, fold mirrors 1006, 1008 (represented as lenses for convenient presentation in FIG. 10), and a laser medium 1010 that are situated along a laser beam axis 1012. The fold mirrors 1006, 1008 have respective focal lengths $f_1$, $f_2$, the end mirror-fold mirror separations are $d_1$, $d_2$, and the fold mirror-laser medium separations are $s_1$, $s_2$. Separations and focal lengths can be selected to form an asymmetric cavity to provide stable, reproducible operation. Some specific typical operation examples are described below. In contrast to conventional designs, the illustrated examples provide laser operation in which beam spot size is controlled at the end mirrors, unlike conventional designs that operate at cavity stability limits and in which the cavity is configured so that increases in cavity lensing tend to produce beam spot sizes that diverge or shrink uncontrollably.

Obtaining stable operation of the laser of FIG. 10 depends on beam spot size in the Kerr medium. If the focusing is too weak (spot size too large, or in-cavity power too low), the laser will not initiate mode locking, or may not be stable for long periods of operation. If the in-cavity power is too large, or the spot too tightly focused, the laser can exhibit temporal instabilities, multiple pulse generation, or Q-switching (which can lead to damage to optical components). Production of a repetitive sequence of stable single pulses at a repetition rate associated with cavity length is preferred.

In some examples, preferred beam spot sizes can be calculated, but beam spot sizes can be conveniently determined experimentally by, for example, measuring CW laser power for different spot sizes. Based on such measurements, a preferred spot size in the gain medium can be selected. Typically, the CW spot size is selected to be somewhat larger that the spot size associated with maximum CW power operation. When KLM is initiated, the spot size decreases slightly and laser operation becomes more stable. Circulating optical power (i.e., in-cavity optical power) can be selected based on output coupler reflectivity. Thus, stable ML operation can be provided by adjusting the CW spot size to be larger than the spot size associated with maximum CW power, and permitting the spot size to adjust (become smaller) during ML operation. Because KGW has a larger nonlinear lensing effect than that associated with Ti:sapphire or Cr:LiSAF, a larger CW spot size can be selected for Yb:KGW operation. This is particularly convenient in view of the relatively large pump volume associated with a diode array. In contrast, in conventional Ti:sapphire or Cr:LiSAF lasers, an expensive laser can be necessary for pumping a small volume of the gain medium.

Typical performance limitations of a conventional symmetric 4-mirror cavity are illustrated in FIG. 11. As shown in FIG. 11, beam radius in the gain medium is graphed as a function of thermal lensing as curve 1102. An increase in combined thermal and Kerr lensing tends to increase beam spot size in the gain medium as shown by an arrow 1104. Moreover, the symmetric cavity is near a stability limit so that small changes in cavity parameters such as, for example, cavity length, can produce undesirable instabilities. For example, a curve 1106 of beam spot size as a function of thermal lensing for a cavity in which the end mirror is displaced by 10 mm from the end mirror position associated with curve 1102 shows that thermal lensing values associated with stable cavities (curve 1102) become unstable (curve 1106).

Beam spot size on the saturable absorbing mirror (SAM) is selected to provide stable mode locked operation. The beam spot size is generally small enough to provide nonlinear saturation, but not so small that the SAM is damaged. Providing an additional (fifth) mirror permits convenient control of beam spot sizes at both the SAM and in the gain medium. In addition, a fifth mirror can provide a convenient collimation region in the cavity and thus provide a location for mirror pairs to provide selected negative dispersion. Total negative dispersion can be readily controlled by changing the number of reflections between such mirrors. Since the beam spot is small and only slowly increasing (the beam is approximately collimated), many reflections are possible. Simple changes in the mirror pair can be used to select laser pulse duration. Pulse peak power does vary as the pulse width changes, but pulse power can be adjusted with corresponding adjustments in output coupler reflectivity.

While an asymmetric cavity with 5 mirrors as described above can be reduced, in principle, to an equivalent two mirror cavity, such an "equivalent" cavity configuration is generally associated with in physically unreasonable mirror locations or excessively delicate mirror alignments.

Conventional mode locked laser configurations include a saturable absorber mirror to stabilize a soliton mode and typically have a thin gain medium (along the beam propagation axis) and cavity designs that minimize nonlinear lensing. In contrast, in the disclosed examples, a saturable mirror initiates pulse formation, and Kerr lensing along a long optical path (for example, 10 mm) in the gain medium establishes a stable mode-locked pulse regime. Large beam spot sizes, for example, 100-200 µm, correspond to Rayleigh ranges of about 30 mm to 120 mm that can be readily accommodated in a 10 mm long gain medium that is 1.4 mm thick. The saturable absorbance of the SAM promotes initialization of mode-locking, but does not typically control the ultimate pulse width of the laser, which is defined by soliton pulse propagation properties.

The configurations described herein generally do not exhibit intensity modulations associated with Q-switching. Conventional configurations use high reflectivity output couplers to reduce energy storage in the gain medium. In some examples, the laser configurations disclosed herein can use output couplers having reflectivities of 70%, 80%, 85%, 90%, or less, and energy storage is not limited to prevent Q-switching.

Figure 12:
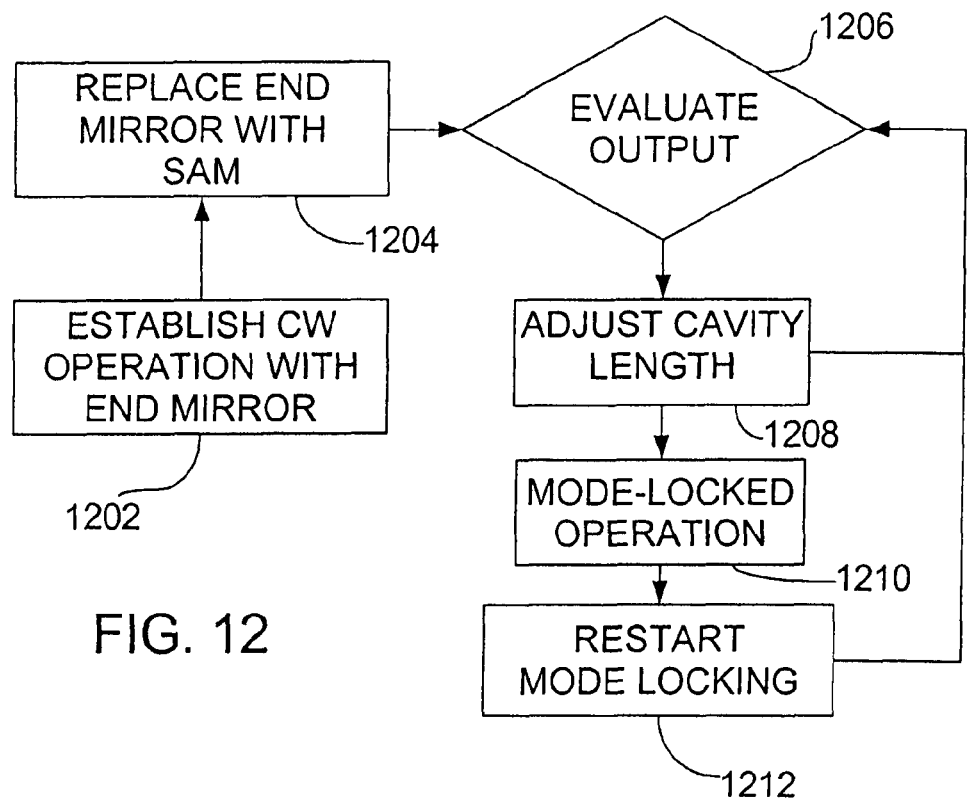
FIG. 12 is a block diagram of a method of establishing mode locking.

Stable mode-locked operation of a five mirror cavity laser (or other cavity configurations) can be achieved in the manner illustrated in FIG. 12. In a step 1204, a SAM that terminates the cavity is replaced by a highly reflective surface (reflectivity typically greater than about 95%), and the cavity is tuned or adjusted to establish continuous wave (CW) operation. In this CW adjustment process, the cavity can be adjusted to select a diode pump beam and CW laser beam overlap. A spot size radius at the gain medium can be selected to be between, for example, about 100 µm and about 180 µm. In a representative example, the spot radius is about 150 µm. The cavity length is adjusted so as to provide stable CW operation (output power variations of less than about 5%, 10%, or 20%), with substantially all output power in a CW beam. Power due to occasional mode-locked or Q-switched pulses is less than about 5% of the total output power, and typically is less than about 1% of the total output power or is practically undetectable. Pulse lengths shorter than 250 fs can be achieved with a 78% output coupler, and longer pulses with an 84% output coupler, but other output couplers can be used.

With satisfactory CW operation established, in a step 1202, the SAM is reinserted. Upon reinsertion of the SAM, the laser transitions from CW operation to ML operation, and ML operation is evaluated in a step 1206. Typically, the evaluation is based on mode locked pulse stability, pulse intensity, or pulse duration. As mode locked operation is generally associated with substantially increased peak optical powers in comparison with CW operation, nonlinear effects in the gain medium upon the transition to ML operation are associated with increased Kerr lensing that is typically greater than thermal lensing associated with diode pumping. As a result of the increase in total cavity lensing, the laser beam spot size is reduced. This process can be self-limiting as peak intensities are prevented from increasing further due to the balance of Kerr Lens effects (proportional to the intensity squared) and increasing spot size based on associated cavity modes.

In a step 1208, a total cavity length is reduced, typically by adjusting a position of the SAM that terminates the laser cavity. Other cavity mirror separations can be determined with simple ABCD matrix operations, if needed to adjust spot sizes in the gain medium and the saturable absorber, which may result in different distances d. Laser output (for example, pulse duration, pulse stability) can be monitored as the cavity length is adjusted and the adjustment process repeated. As cavity length is changed, beam spot size in the gain medium tends to increase because beam size is a function of cavity geometry. The increased beam spot size is associated with increased laser output power in mode locked operation.

Mode-locked operation of a laser cavity adjusted in this manner may not begin automatically if laser operation is stopped, and in a step 1212 the mode-locked operation can be reestablished by adjusting the cavity length. Alternatively, the mode-locked operation can be started again by a mechanical disturbance of the laser cavity or one or more cavity elements.

Figure 13:
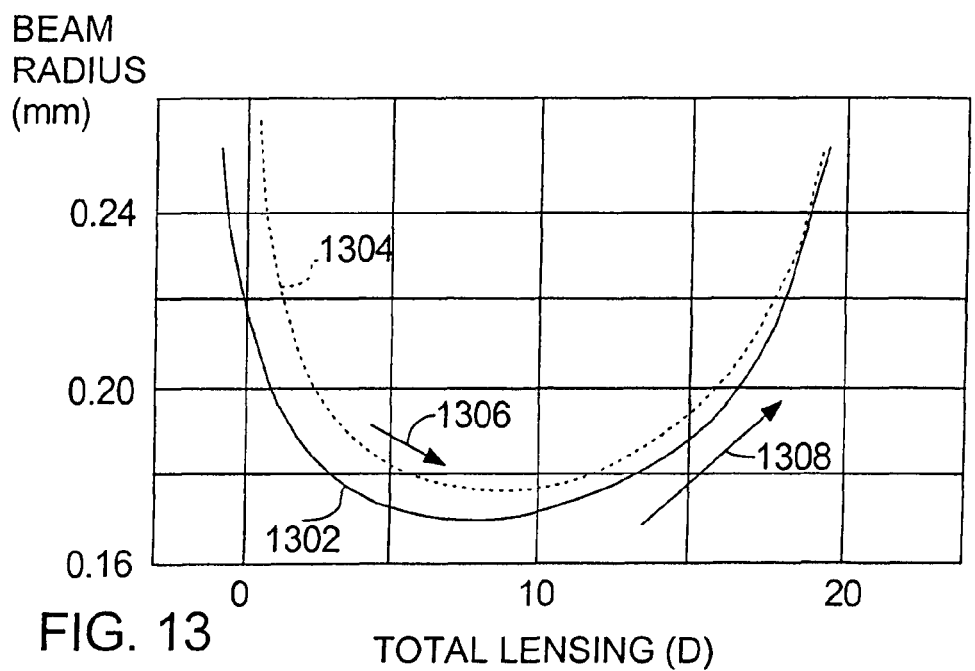
FIG. 13 is a graph of laser beam radius as a function of cavity length for a representative four mirror laser cavity adjusted for mode-locked operation.

As peak power is increased in a stable pulse train, Kerr lensing (proportional to peak power squared,) increases with an associated increasing loss as is illustrated in FIG. 13 for the illustrated four mirror cavity configuration. This effect limits the peak power in the cavity. Q-switching is still possible but only with long pulses, and not in combination with short mode-locked pulses. Thus, the unconventional laser configurations disclosed herein include pulse initiation based on a SAM, increasing pulse energy to a stable value by Kerr lensing, and self-limiting at increasing peak intensities, permitting an increased beam spot size. As shown in FIG. 13, a curve 1302 illustrates beam radius as a function of total lensing. As Kerr lensing increases, the laser operation point shifts as indicated by arrow 1306. However, Q-switching is associated with further increases in lensing as indicated by arrow 1308 that produces increases in beam radius and cavity losses. Curve 1304 is similar to the curve 1302 but corresponds to a cavity configuration in which an end mirror is displaced so as to produce a 10 mm shorter cavity.

Figure 14:
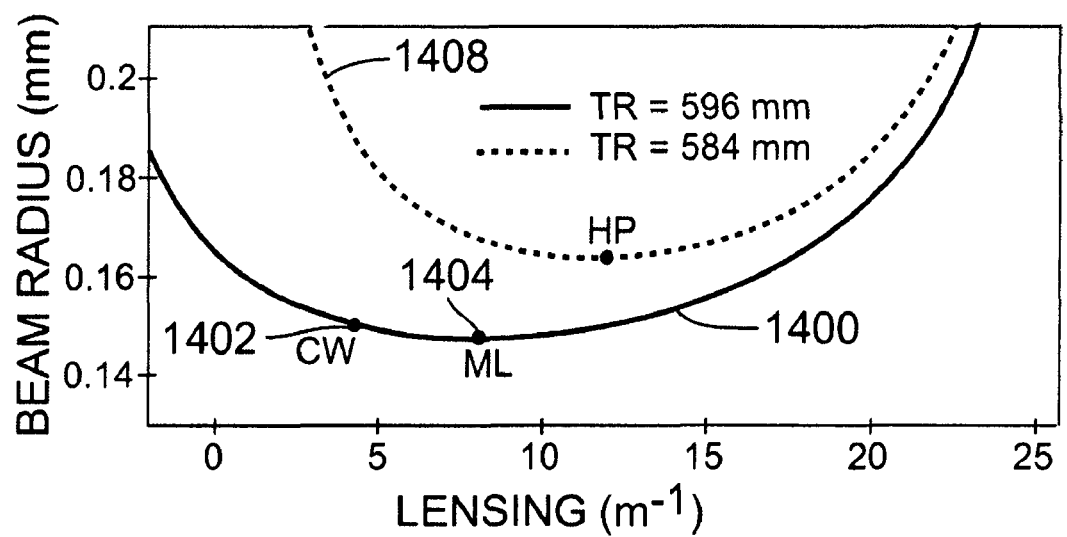
FIG. 14 is a graph of laser beam radius as a function of cavity length for a representative asymmetric five mirror laser cavity adjusted for mode-locked operation.

Referring to FIG. 14, beam radius as a function of total lensing is graphed for two cavity configurations. A curve 1400 illustrates an initial cavity configuration that is adjusted to provide CW operation associated with a beam radius and total lensing corresponding to a point 1402. Upon reinsertion of a SAM, the laser begins to mode lock and has a beam radius and total lensing corresponding to a point 1404. The cavity length is then adjusted, and beam radius and total lensing are associated with a point 1406 on a curve 1408 that is associated with a shorter cavity length.

Representative cavity dimensions and mirror focal lengths are listed in Table 3. In the configurations of Table 3, the focal lengths $f_1$ and $f_2$ are equal, but in other examples, they are not.

TABLE 3

Mode locked laser cavity dimensions (mm)

| Length in mm | Symmetric 4 mirror | Asymmetric 4 mirror | Asymmetric 5 mirror |
|---|---|---|---|
| $d_1$ | 800 | 880 | 750 |
| $f_1 = f_2$ | 250 | 250 | 250 |
| $s_1$ | 360 | 325 | 355 |
| t | 10 | 10 | 10 |
| $s_2$ | 360 | 380 | 370 |
| $d_2$ | 800 | 560 | 1870 plus additional mirror |

Diode pumping and laser adjustment as described above permits simple, convenient mode locking configurations that provide stable mode locked pulse trains. Representative mode locked lasers include a five mirror asymmetric cavity such as shown in FIG. 1A that contains a saturable absorber mirror (SAM), a gain medium (Yb:KGW), an output coupler (OC), and a diode laser, diode laser array or diode laser bar as the pump laser. The cavity design allows convenient and independent adjustment of spot size in a gain medium and in a SAM, thus permitting control of damage to these or other components and stable mode-locked operation. In this example, the SAM is associated with initiation of pulsed operation while the Kerr effect is associated with pulse train stabilization. Pulse width can be tuned by changing cavity dispersion and can be selected independently of the SAM. In-cavity power can be adjusted by changing output coupler reflectivity. A polarization pumping scheme, as described above, allows pump light to be effectively and directly coupled into the cavity. The scheme is practical, compact, inexpensive, and allows greater pumping efficiencies in this gain medium than those obtained with conventional designs. For example, 35 W of pump power can produce at least about 7 W of mode locked power, and typically efficiencies (laser power/pump power) of at least about 15% to 20% can be achieved.

Laser operating points can be selected to be at or near a center of a cavity stability zone, not near a stability limit as is typical of other mode-locked (ML) lasers and conventional cavity arrangements. The operating point can correspond to a large spot in the gain medium relative to conventional lasers that have spot sizes about 10 times smaller in diameter and 100 times in area. For example, beam spot sizes of 0.1 to 0.2 mm are convenient in this illustrative example, and the associated Rayleigh ranges are at least as large as about 10 mm or more. The large beam spot sizes and associated Rayleigh ranges can be particularly beneficial due to the large volume pumped by a diode bar. The operation of this asymmetric five mirror example is relatively insensitive to slight movements of the mirrors or other cavity perturbations.

In an example based on the cavity configuration of FIG. 1A (and corresponding to FIG. 14), the output CW laser beam is a single mode, diffraction-limited beam with a high reflectively mirror substituted for the SAM 190. The distance d=596 mm. With the large number of changes in mirror radius and spacing available, a wide variety of spot sizes could be produced, and for each, a range of distances d could be estimated. [HOW?] As shown in FIG. 14, thermal lensing in the gain medium is about 4 D. Upon reinsertion of the SAM 190, the distance d is reduced to 584 mm by adjusting the position of the SAM 190 using, for example, the translation stage 188. The cavity could also be adjusted in other ways such as by translating the output coupler 186 or the mirrors 180, 182 or otherwise decreasing an effective cavity length. This procedure shifts the functional dependence of beam radius on total lensing from curve 1400 to curve 1408 as shown in FIG. 14. Beam radius (spot size) on the gain medium and on the SAM 194 is increased. The increased Kerr lensing pushes the laser operating point towards the minimum of a stability zone (point 1406) and the process is self-limiting as further increases in lensing increase losses due to increased beam radius.

Many conventional lasers include short laser crystals in which pump radiation is deposited over a short length (about 1 mm), in contrast to the long lengths (5-10 mm or longer) as described herein. At high pump powers, short crystals exhibit large temperature increases that cause thermal stress and thermal lensing n the gain medium that limit laser performance. Low Yb doping in long, thick crystals of Yb:KGW and the associated larger pump volumes produces smaller temperature changes. A thin slab with side-cooling as described above promotes heat transport away from the gain medium. In addition, thermo-optic effects in KGW are anisotropic, and at particular directions in the crystal, thermal lensing is reduced and beam quality is improved. Laser beam propagation along the c-axis provides both desirable spectral properties and good thermal lensing properties.

In the examples described above, an asymmetric laser cavity includes first and second cavity portions that are situated on opposite sides of a gain medium. Typically, a length of one of the cavity portions is much greater than the other, and provides a collimation region for insertion of, for example, multiple-reflection dispersion control devices such as Gires-Tournois interferometers or other optical components.

In view of the many possible embodiments to which the principles of the disclosed technology may be applied, it should be recognized that the illustrated embodiments are only representative examples and should not be taken as limiting. For example, polarization based pumping can be used with gain media having absorption or emission cross sections that are function of polarization, or with gain media in which these cross sections are independent of polarization. In addition, laser diodes are convenient pump sources, but in other examples, pump radiation can be obtained from other pump sources. Example gain media include solid state gain media, but other optically pumped gain media can be similarly configured. Thus, the scope of the invention is not limited by the illustrated examples but is defined by the following claims. I therefore claim as my invention all that comes within the scope and spirit of these claims.

I claim:

1. A laser, comprising:
    a gain medium situated on a laser axis;
    a laser cavity having a first cavity segment terminated by an output coupler and a second cavity segment terminated by a saturable absorber mirror (SAM), wherein the first and second cavity segments are situated on the axis and on opposite sides of the gain medium, the first cavity segment including a collimation region; and
    a dispersion device situated in the collimation region.

2. The laser of claim 1, wherein the first and second cavity segments are optically asymmetric.

3. The laser of claim 1, further comprising:
    a source of pump radiation that emits radiation substantially at a pump wavelength; and
    a polarizer configured to couple laser radiation at the laser wavelength and having a first state of polarization from the gain medium along the laser axis and the pump radiation from the source of pump radiation having a second state of polarization to the gain medium along a pump axis, wherein the laser axis and the pump axis are parallel in the gain medium.

4. The laser of claim 3, wherein the source of pump radiation is an array of laser diodes.

5. The laser of claim 4, wherein the gain medium is situated to substantially absorb the pump radiation at the pump wavelength in the second state of polarization.

6. The laser of claim 5, wherein the gain medium is situated to substantially absorb the pump radiation in substantially the second state of polarization and emit laser radiation in substantially the first state of polarization.

7. The laser of claim 6, wherein the gain medium is an anisotropic crystal.

8. The laser of claim 7, wherein the gain medium is Yb:KGW.

9. The laser of claim 1, wherein the first cavity segment includes a first fold reflector having a first optical power and the second cavity segment includes a second fold reflector having a second optical power, wherein the first fold reflector and the second fold reflector are situated to direct the laser beam into a pumped volume of the gain medium.

10. The laser of claim 1, wherein:
    the laser cavity is an asymmetric cavity; and
    the gain medium is situated in the asymmetric cavity so that mode locked pulses produce lensing in the gain medium so as to decrease a beam spot size in the gain medium.

11. The laser of claim 10, further comprising a pump source configured to establish a pump volume in the gain medium, wherein the pump source produces lensing in the gain medium that tends to decrease the beam spot size in the gain medium.

12. The laser of claim 11, wherein the saturable absorber mirror (SAM) terminates the asymmetric cavity.

13. The laser of claim 12, wherein the asymmetric cavity defines a collimation region, and the saturable absorber mirror is situated in the collimation region.

14. The laser of claim 13, further comprising a mirror pair configured to provide a selected negative dispersion, the mirror pair situated in the collimation region.

15. The laser of claim 10, wherein the gain medium is Yb:KGW.

16. The laser of claim 11, wherein the gain medium is a slab of thickness t and the beam spot size in the gain medium is at least t/10.

17. The laser of claim 11, wherein the gain medium is a slab of length L and the beam spot size is at least L/100.

18. A method, comprising:
   situating a gain medium in an asymmetric laser cavity;
   providing a substantial collimation in a portion of the laser cavity and situating a GTI in the collimated portion;
   pumping the gain medium;
   establishing continuous wave laser output;
   terminating the laser cavity with a saturable absorber; and
   adjusting a laser cavity dimension to establish substantially mode-locked operation.

19. The method of claim 18, wherein the laser cavity dimension is a distance to the SAM along a laser axis, and the dimension adjustment is a decrease.

20. The method of claim 19, further comprising coupling optical power out of the laser cavity with an output coupler having a reflectivity of less than about 85%.

21. The method of claim 20, wherein the gain medium is Yb:KGW.

22. The method of claim 20, further comprising defining the laser cavity with an output coupler and a SAM that terminate the laser cavity, and at least two fold mirrors having optical power, so that a substantially collimated region is situated between a fold mirror and the SAM.

23. The method of claim 20, further comprising pumping the gain medium in a first polarization and producing laser radiation in a second polarization in response to the pump radiation.

24. The method of claim 23, wherein the first polarization and the second polarization are substantially orthogonal.

25. The method of claim 18, further comprising adjusting a laser pulse duration by selecting a negative dispersion.

* * * * *